(12) United States Patent
Nakamura et al.

(10) Patent No.: US 11,594,726 B2
(45) Date of Patent: Feb. 28, 2023

(54) POSITIVE ELECTRODE ACTIVE MATERIAL FOR LITHIUM ION SECONDARY BATTERY, METHOD FOR MANUFACTURING POSITIVE ELECTRODE ACTIVE MATERIAL FOR LITHIUM ION SECONDARY BATTERY, AND LITHIUM ION SECONDARY BATTERY

(71) Applicant: SUMITOMO METAL MINING CO., LTD., Tokyo (JP)

(72) Inventors: Takuma Nakamura, Ehime (JP); Haruki Kaneda, Ehime (JP); Yuki Koshika, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 421 days.

(21) Appl. No.: 16/651,965

(22) PCT Filed: Sep. 25, 2018

(86) PCT No.: PCT/JP2018/035288
§ 371 (c)(1),
(2) Date: Mar. 27, 2020

(87) PCT Pub. No.: WO2019/065566
PCT Pub. Date: Apr. 4, 2019

(65) Prior Publication Data
US 2020/0259177 A1    Aug. 13, 2020

(30) Foreign Application Priority Data
Sep. 28, 2017 (JP) .............................. JP2017-189043

(51) Int. Cl.
| | |
|---|---|
| *H01M 4/525* | (2010.01) |
| *H01M 4/04* | (2006.01) |
| *H01M 4/1391* | (2010.01) |
| *H01M 4/131* | (2010.01) |
| *H01M 10/0525* | (2010.01) |
| *H01M 4/02* | (2006.01) |

(52) U.S. Cl.
CPC ......... *H01M 4/525* (2013.01); *H01M 4/0471* (2013.01); *H01M 4/131* (2013.01); *H01M 4/1391* (2013.01); *H01M 10/0525* (2013.01); *H01M 2004/028* (2013.01)

(58) Field of Classification Search
CPC ... C01G 23/005; C01G 53/50; C01P 2002/02; C01P 2002/54; C01P 2002/60; C01P 2004/51; C01P 2004/61; C01P 2004/80; C01P 2004/84; C01P 2006/40; H01M 10/0525; H01M 2004/028; H01M 4/0471; H01M 4/131; H01M 4/1391; H01M 4/36; H01M 4/505; H01M 4/525
See application file for complete search history.

(56) References Cited

U.S. PATENT DOCUMENTS

| | | | |
|---|---|---|---|
| 2017/0324090 A1* | 11/2017 | Ryoshi | .................. C01G 53/50 |
| 2017/0358799 A1* | 12/2017 | Gunji | .................. H01M 4/366 |

FOREIGN PATENT DOCUMENTS

| | | |
|---|---|---|
| JP | 2005-251716 A | 9/2005 |
| JP | 2008-147068 A | 6/2008 |
| JP | 2010-073686 A | 4/2010 |
| JP | 2011-108554 A | 6/2011 |
| JP | 2012-089521 A | 5/2012 |
| JP | 2013-239434 A | 11/2013 |
| JP | 2015-122298 A | 7/2015 |
| WO | 2016/068263 A1 | 5/2016 |

OTHER PUBLICATIONS

Jan. 8, 2019 International Search Report issued in International Patent Application No. PCT/JP2018/035288.

\* cited by examiner

*Primary Examiner* — Carlos Barcena
(74) *Attorney, Agent, or Firm* — Oliff PLC

(57) ABSTRACT

A positive electrode active material for obtaining a lithium ion secondary battery, wherein capacity, electron conductivity, durability, and heat stability at the time of overcharge are improved, durability and heat stability being achieved at a high level, and including: a lithium nickel manganese composite oxide composed of secondary particles, in which a plurality of primary particles are flocculated, wherein the composite oxide is represented by a general formula (1): $Li_d Ni_{1-a-b-c} Mn_a M_b Ti_c O_2$ (wherein, M is at least one kind of element selected from Co, W, Mo, V, Mg, Ca, Al, Cr, Zr and Ta, $0.05 \leq a \leq 0.60$, $0 \leq b \leq 0.60$, $0.02 \leq c \leq 0.08$, $0.95 \leq d \leq 1.20$), at least a part of titanium in the composite oxide is solid-solved in the primary particles, and, a lithium titanium compound exists on a surface of the positive electrode active material for the lithium ion secondary battery.

15 Claims, 1 Drawing Sheet

POSITIVE ELECTRODE ACTIVE MATERIAL FOR LITHIUM ION SECONDARY BATTERY, METHOD FOR MANUFACTURING POSITIVE ELECTRODE ACTIVE MATERIAL FOR LITHIUM ION SECONDARY BATTERY, AND LITHIUM ION SECONDARY BATTERY

BACKGROUND OF THE INVENTION

Field of the Invention

The present invention relates to a positive electrode active material for a lithium ion secondary battery, a method for manufacturing a positive electrode active material for a lithium ion secondary battery, and a lithium ion secondary battery. This application is based upon and claims the benefit of priority from prior Japanese Patent Application No. 2017-189043 filed on Sep. 28, 2017 in Japan, which is incorporated by reference herein.

Description of Related Art

In recent years, there has been a strong demand for the development of compact and lightweight secondary batteries having a high energy density and durability due to the widespread use of portable electronic devices such as mobile phones and notebook computers. In addition, there has been a strong demand for the development of secondary batteries excellent in output characteristic as batteries for electric vehicles including hybrid electric vehicles, and for electric tools.

As secondary batteries satisfying such demands, there is a lithium ion secondary battery. Especially, a lithium ion secondary battery using layered or spinel type lithium transition metal composite oxide as a positive electrode material can obtain high voltage as 4V grade, so it is being in practical use as a battery having high energy density.

As a positive electrode active material used for a lithium ion secondary battery, a lithium nickel cobalt manganese composite oxide ($LiNi_{1/3}Co_{1/3}Mn_{1/3}O_2$) which is excellent in heat stability and high capacity is gathering attention recently. The lithium nickel cobalt manganese composite oxide is a layered compound as lithium cobalt composite oxide and lithium nickel composite oxide, and in a transition metal site, it contains nickel, cobalt, and manganese basically in a proportion of 1:1:1 in composition ratio.

By the way, a technology to add metal elements such as titanium, zirconium, and else to a positive electrode active material in purpose of obtaining a positive electrode having high performance (high cycle characteristics, high capacity, and high output) as a lithium ion secondary battery has been proposed.

For example, in Patent Literature 1, a positive electrode active material for a lithium ion secondary battery comprising a lithium transition metal composite oxide composed of particles of polycrystal structure obtained by a manufacturing method comprising a mixing step for obtaining a lithium mixture by mixing a nickel-containing hydroxide, a lithium compound, and a titanium compound, and a firing step for obtaining the lithium transition metal composite oxide by firing the lithium mixture, is proposed. It is described that this positive electrode active material can achieve high heat stability and charge and discharge capacity, and excellent cycle characteristics.

In addition, in Patent Literature 2, a positive electrode active material for a nonaqueous electrolyte secondary battery at least comprising a lithium transition metal composite oxide of layered structure, wherein the lithium transition metal composite oxide exists in a form of particles composed of one or both of primary particles and secondary particles which are aggregates of the primary particles, and the positive electrode active material for the nonaqueous electrolyte secondary battery comprises a compound containing at least one kind selected from a group consisting of molybdenum, vanadium, tungsten, boron, and fluorine, at least on a surface of the particles, is proposed. It is described that a conductivity is improved by comprising the compound on a surface of the particles.

In addition, in Patent Literature 3, lithium transition metal based compound powder for a lithium secondary battery comprising a lithium transition metal based compound capable of inserting and de-inserting lithium ions as main component, and prepared by firing main component raw materials, after adding at least one kind respectively from both of a compound containing at least one kind of element selected from B and Bi, and a compound containing at least one kind of element selected from Mo, W, Nb, Ta, and Re, is proposed. It is described that it is possible to obtain the lithium transition metal based compound powder which can be handled easily, and in which electrodes can be adjusted easily, and also, which is having improved rate or output characteristics, by firing after adding both of additive elements.

In addition, in Patent Literature 4, a positive electrode composition for a nonaqueous electrolyte secondary battery comprising a lithium transition metal composite oxide represented by a general formula $Li_aNi_{1-x-y}Co_xM^1_yW_zM^2_wO_2$ (wherein $1.0 \le a \le 1.5$, $0 \le x \le 0.5$, $0 \le y \le 0.05$, $0.002 \le z \le 0.03$, $0 \le w \le 0.02$, $0 \le x+y \le 0.7$, $M^1$ is at least one kind selected from a group consisting of Mn and Al, $M^2$ is at least one kind selected from a group consisting of Zr, Ti, Mg, Ta, Nb and Mo), and a boron compound at least containing a boron element and an oxygen element, is proposed. It is described that it is possible to improve output characteristics and cycle characteristics, by using the positive electrode composition containing the lithium transition metal composite oxide, which essentially comprises nickel and tungsten, and the specific boron compound.

Patent Literature 1: JP 2015-122298 A
Patent Literature 2: JP 2005-251716 A
Patent Literature 3: JP 2011-108554 A
Patent Literature 4: JP 2013-239434 A

SUMMARY OF THE INVENTION

However, in the above proposals, there are improvements in output characteristics, energy density, and durability in every case, but it is insufficient about improvement of heat stability, so there is a demand for development of a positive electrode active material capable of improving these characteristics. In addition, in the above proposals, it is often difficult to be produced in factory scale, as the processes are complicated and as they are difficult to scale up. Further, combustible nonaqueous electrolyte is used as the above battery material, so high heat stability is required especially when it is overcharged.

Here, the present invention is invented considering these circumstances, and a purpose of the preset invention is to provide a positive electrode active material for obtaining a lithium ion secondary battery, in which not only capacity and electron conductivity, but also, durability and heat stability at the time of overcharge are improved, and in which both of durability and heat stability are achieved at a high level. In addition, a purpose of the present invention is to provide a method capable of manufacturing such positive electrode active material easily for production in factory scale.

A positive electrode active material for a lithium ion secondary battery relating to one embodiment of the present invention is a positive electrode active material for a lithium ion secondary battery comprising a lithium nickel manganese composite oxide composed of secondary particles, in which a plurality of primary particles are flocculated, wherein the lithium nickel manganese composite oxide is represented by a general formula (1): $Li_dNi_{1-a-b-c}Mn_aM_bTi_cO_2$ (wherein, in the general formula (1), M is at least one kind of element selected from Co, W, Mo, V, Mg, Ca, Al, Cr, Zr and Ta, $0.05 \le a \le 0.60$, $0 \le b \le 0.60$, $0.02 \le c \le 0.08$, $0.95 \le d \le 1.20$), at least a part of titanium in the lithium nickel manganese composite oxide is solid-solved in the primary particles, and also, a lithium titanium compound exists on a surface of the positive electrode active material for the lithium ion secondary battery.

In this way, a positive electrode active material for obtaining a lithium ion secondary battery, in which not only capacity and electron conductivity, but also, durability and heat stability at the time of overcharge are improved, and in which both of durability and heat stability are achieved at a high level, is provided.

At this time, in one embodiment of the present invention, average titanium concentration in the primary particles may be 0.5 at % or more and 5 at % or less of constituent metal elements other than lithium.

In this way, durability and heat stability at the time of overcharge are improved, and both of durability and heat stability of the lithium ion secondary battery are achieved at a higher level.

At this time, in one embodiment of the present invention, the lithium titanium compound may be one kind or more of any of $Li_3TiO_4$, $LiTiO_3$, $LiTi_3O_8$, $Li_8Ti_2O_9$.

In this way, a composition of the lithium titanium compound will be optimum, and the positive electrode active material for obtaining the lithium ion secondary battery, in which not only capacity and electron conductivity, but also, durability and heat stability at the time of overcharge are improved, and in which both of durability and heat stability are achieved at a higher level, is provided.

At this time, in one embodiment of the present invention, the lithium titanium compound may include an amorphous phase.

In this way, battery characteristics of the lithium ion secondary battery is more improved, as an amorphous phase is more excellent than a crystal phase in lithium ion conductivity.

At this time, in one embodiment of the present invention, a volume average particle size MV of the secondary particles may be 5 μm or more and 20 μm or less.

In this way, both of high output characteristics and battery capacity of the lithium ion secondary battery, and high filling property to a positive electrode are achieved.

At this time, in one embodiment of the present invention, a crystallite diameter of the lithium nickel manganese composite oxide calculated by a full width at half maximum of 003 diffraction peak by a Scherrer method using a measurement result of XRD may be 500 Å or more and 2000 Å or less.

In this way, high durability of the secondary battery is obtained without decreasing a battery capacity.

In one embodiment of the present invention, a method for manufacturing a positive electrode active material for a lithium ion secondary battery comprising a lithium nickel manganese composite oxide, at least comprising: a mixing step for adding a mixture containing nickel manganese composite hydroxide particles, a titanium compound, and a lithium compound; and a firing step for obtaining the lithium nickel manganese composite oxide by firing the mixture, wherein the nickel manganese composite hydroxide particles added in the mixing step is represented by a general formula (2): $Ni_{1-a-b}Mn_aM_b(OH)_{2+\alpha}$ (wherein, in the general formula (2), M is at least one kind of element selected from Co, W, Mo, V, Mg, Ca, Al, Cr, Zr and Ta, $0.05 \le a \le 0.60$, $0 \le b \le 0.60$, $0 \le \alpha \le 0.4$), the firing step is performed in an oxidizing atmosphere with oxygen concentration of 40 vol % or more and 100 vol % or less, at a temperature of 750° C. or more and 1000° C. or less, the lithium nickel manganese composite oxide obtained by the firing step is represented by a general formula (3): $Li_dNi_{1-a-b-c}Mn_aM_bTi_cO_2$ (wherein, in the general formula (3), M is at least one kind of element selected from Co, W, Mo, V, Mg, Ca, Al, Cr, Zr and Ta, $0.05 \le a \le 0.60$, $0 \le b \le 0.60$, $0.02 \le c \le 0.08$, $0.95 \le d \le 1.20$), the lithium nickel manganese composite oxide is composed of secondary particles, in which a plurality of primary particles are flocculated, at least a part of titanium in the lithium nickel manganese composite oxide is solid-solved in the primary particles, and also, a lithium titanium compound exists on a surface of the positive electrode active material for the lithium ion secondary battery.

In this way, the positive electrode active material for obtaining the lithium ion secondary battery, in which not only capacity and electron conductivity, but also, durability and heat stability at the time of overcharge are improved, and in which both of durability and heat stability are achieved at a high level, is provided.

At this time, in one embodiment of the present invention, in the firing step, a firing may be performed for 2 hours or more and 20 hours or less at a temperature of 850° C. or more and 1000° C. or less, after performing a firing for 1 hour or more and 4 hours or less at a temperature of 750° C. or more and 850° C. or less.

In this way, lithium in the lithium compound is diffused in the composite hydroxide particles, and the lithium nickel manganese composite oxide composed of particles of polycrystal structure is formed, so both of heat stability at the time of overcharge and electron conductivity of the lithium ion secondary battery are achieved at a higher level.

At this time, in one embodiment of the present invention, in the mixing step, a volume average particle size MV of the titanium compound to be added may be 0.01 μm or more and 10 μm or less.

In this way, the titanium compound is added with aimed composition, and Ti in the lithium nickel manganese composite oxide after firing is distributed uniformly, so heat stability of the lithium ion secondary battery is ensured for more.

At this time, in one embodiment of the present invention, in the mixing step, the titanium compound to be added may be titanate compound or titanium oxide.

In this way, mixing of impurities is prevented, so heat stability at the time of overcharge of the lithium ion secondary battery is more improved.

At this time, in one embodiment of the present invention, it further comprises a roasting step for heat-treating the nickel manganese composite hydroxide particles before the mixing step, and the roasting step may be performed at a temperature of 105° C. or more and 700° C. or less.

In this way, residual moisture in the composite hydroxide particles is removed and conversion into oxide progresses, so heat stability at the time of overcharge of the lithium ion secondary battery is more improved, as variation of Li/Me of the positive electrode active material is inhibited.

In one embodiment of the present invention, the positive electrode active material for the lithium ion secondary battery is used as a positive electrode.

In this way, the positive electrode for obtaining the lithium ion secondary battery, in which not only capacity and electron conductivity, but also, durability and heat stability at the time of overcharge are improved, and in which both of durability and heat stability are achieved at a high level, is provided.

According to the present invention, a positive electrode active material for obtaining a lithium ion secondary battery, in which not only capacity and electron conductivity, but also, durability and heat stability at the time of overcharge are improved, and in which both of durability and heat stability are achieved at a high level, is provided. In addition, the present invention is having extremely significant industrial value as it is capable of manufacturing such positive electrode active material easily for production in factory scale.

DETAILED DESCRIPTION OF THE INVENTION

Figure 1:
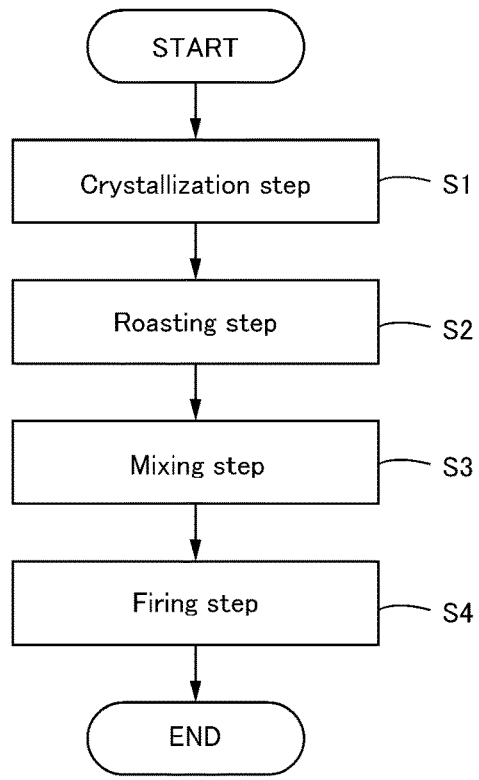
FIG. 1 is a flow chart illustrating an outline of a method for manufacturing a positive electrode active material for a lithium ion secondary battery relating to one embodiment of the present invention.

As a result of keen examination for resolving the above problems, the inventors have found that both of electron conductivity and high heat stability by inhibition of oxygen release at the time of overcharge can be achieved, while maintaining battery characteristics by adding specific amount of titanium to a lithium nickel manganese composite oxide containing specific amount of manganese, and completed the present invention. Hereinafter, explaining about a preferred embodiment of the present invention.

In addition, the present embodiments explained in below are not intended to unjustly limit the content of the present invention described in claims, and it can be modified within a scope not deviating from a gist of the present invention. In addition, not all of the features explained in the present embodiments are always necessary as means for solving the problem of the present invention. Explaining about a positive electrode active material for a lithium ion secondary battery, a method for manufacturing a positive electrode active material for a lithium ion secondary battery, and a lithium ion secondary battery relating to one embodiment of the present invention, in the following order.

1. Positive electrode active material for lithium ion secondary battery
2. Method for manufacturing positive electrode active material for lithium ion secondary battery
   2-1. Crystallization step
   2-2. Roasting step
   2-3. Mixing step
   2-4. Firing step
3. Lithium ion secondary battery
   3-1. Positive electrode
   3-2. Negative electrode
   3-3. Separator
   3-4. Nonaqueous electrolytic solution
   3-5. Shape and composition of secondary battery
   3-6. Characteristics of secondary battery <1. Positive Electrode Active Material for Lithium Ion Secondary Battery>

A positive electrode active material for a lithium ion secondary battery (hereinafter, referred to as "positive electrode active material") relating to one embodiment of the present invention is composed of particles of polycrystal structure, and comprises a lithium nickel manganese composite oxide (hereinafter, referred to as "lithium nickel manganese composite oxide") composed of secondary particles, in which a plurality of primary particles are flocculated. The lithium nickel manganese composite oxide is represented by a general formula (1): $Li_dNi_{1-a-b-c}Mn_aM_b\text{-}Ti_cO_2$ (wherein, in the general formula (1), M is at least one kind of element selected from Co, W, Mo, V, Mg, Ca, Al, Cr, Zr and Ta, $0.05 \leq a \leq 0.60$, $0 \leq b \leq 0.60$, $0.02 \leq c \leq 0.08$, $0.95 \leq d \leq 1.20$).

And, at least a part of titanium in the lithium nickel manganese composite oxide is solid-solved in the primary particles, and also, a lithium titanium compound exists on a surface of the positive electrode active material for the lithium ion secondary battery.

High heat stability is required for the lithium ion secondary battery, as it uses combustible nonaqueous electrolyte as battery materials. For example, in the lithium ion secondary battery, it is known that oxygen will be released from a positive electrode active material crystal by applying heat in a charging condition, and that a thermal runaway occurs as the released oxygen reacts with an electrolytic solution. As a method for improving heat stability, a method for stabilizing a crystal structure by adding elements of different kind in the positive electrode active material, and a method for coating a surface of the positive electrode active material with oxide such as $SiO_2$, $Al_2O_3$, $ZrO_2$, are proposed. However, these methods are difficult to achieve both of battery capacity and heat stability, as initial charge and discharge capacity is decreased significantly. In addition, it is often difficult to produce in factory scale, as the processes are complicated and as they are difficult to scale up.

Here, according to the present invention, both of electron conductivity and high heat stability by inhibition of oxygen release at the time of overcharge can be achieved, while maintaining battery characteristics by adding specific amount of titanium to a lithium nickel manganese composite oxide containing specific amount of manganese, and it can be manufactured easily for production in factory scale. Explaining in detail in below.

The positive electrode active material relating to one embodiment of the present invention contains a specific amount of titanium (Ti), and the titanium exists in a form of a lithium titanium compound on a surface of the positive electrode active material and in the primary particles. The lithium ion secondary battery (hereinafter, referred to as "secondary battery") using this positive electrode active material is having high capacity, and also, having high electron conductivity and durability. In addition, the secondary battery is having high heat stability especially at the time of overcharge of the positive electrode active material, compared to the positive electrode active material not containing titanium.

In the general formula (1), a range of "a" indicating Mn content is $0.05 \leq a \leq 0.60$, preferably $0.10 \leq a \leq 0.55$, more preferably $0.10 \leq a \leq 0.50$, further preferably $0.12 \leq a \leq 0.45$. When a value of "a" is within the above range, excellent durability, high capacity and electron conductivity are obtained, and further, high heat stability is achieved. In addition, as mentioned in the above, durability and heat stability of the secondary battery are improved, by containing Mn and Ti in the above proportion in the lithium nickel manganese composite oxide. On the other hand, when a value of "a" is less than 0.05, an effect to improve heat stability is not obtained. In addition, when a value of "a" is more than 0.60, charge and discharge capacity of the secondary battery is decreased.

In the general formula (1), a range of "c" indicating Ti content is $0.02 \leq c \leq 0.08$. When a value of "c" is in the above range, extremely excellent durability is obtained, and also, high heat stability is obtained by inhibiting oxygen release at the time of overcharge when it is used as a positive electrode of the secondary battery. On the other hand, when a value of "c" is less than 0.02, titanium is solid-solved in the primary particles, but the lithium titanium compound is seldom formed on a surface of the positive electrode active material, and an effect to improve durability is not confirmed. In addition, when a value of "c" is more than 0.08, the lithium titanium compound which functions as a resistance layer is generated in large quantities, so a battery capacity is decreased significantly. Further, from a point of view of obtaining higher durability and heat stability, a range of "c" is more preferably $0.02 \leq c \leq 0.04$. In addition, a composition of the lithium nickel manganese composite oxide can be measured by a quantitative analysis by an inductively coupled plasma (ICP) emission spectrometry. Existence of the lithium titanium compound can be confirmed by X-ray diffraction measurement or the like.

In the general formula (1), M indicating additive element is at least one kind of element (hereinafter, referred to as "additive element M") selected from Co, W, Mo, V, Mg, Ca, Al, Cr, Zr and Ta, and when "b" is more than 0, heat stability, storage characteristics, and battery characteristics are improved. A range of "b" is $0 \leq b \leq 0.60$. For example, when M contains Co, it is preferably $0.05 \leq b \leq 0.5$, more preferably, $0.1 \leq b \leq 0.4$.

In the positive electrode active material relating to one embodiment of the present invention, at least a part of titanium is solid-solved in the primary particles, and also, a lithium titanium compound exists on a surface of the positive electrode active material. The effect to improve heat stability is based on solid-solving of titanium into the primary particles, and the effect to improve electron conductivity is based on the lithium titanium compound existing on a surface of the primary particles and a surface of the secondary particles. Here, the solid-solving of titanium means a condition that titanium is detected, for example by ICP emission spectrometry, and that titanium is detected in the primary particles, by a surface analysis of a section of the primary particles using EDX in scanning transmission electron microscope (S-TEM), and it is preferable that titanium is detected over entire surface in the primary particles.

Further, it is preferable that maximum titanium concentration of a part having locally high titanium concentration in a primary particle is three times or less with respect to average titanium concentration in the primary particle. When maximum titanium concentration in the primary particle is more than the above range, fluctuation of titanium concentration in the primary particle is too high, and there will be a part having locally high titanium concentration and a part having locally low titanium concentration. Therefore, in a part having locally high titanium concentration, a part having high reaction resistance will be generated, and in a part having locally low titanium concentration, the effect to improve heat stability by solid-solving of titanium may not be obtained sufficiently. From a point of view of achieving both of heat stability and battery characteristics of the secondary battery, it is preferable that maximum titanium concentration in a primary particle is two times or less of average titanium concentration in the primary particle. In addition, in order to obtain higher effect, it is preferable that there is no part having extremely low titanium concentration in a primary particle, and it is preferable that minimum titanium concentration in a primary particle is 0.5 times or more with respect to average titanium concentration in the primary particle. On the other hand, when the lithium titanium compound exists on a surface of the positive electrode active material, there is a case that titanium concentration on a surface or a grain boundary of a primary particle will be three times or more with respect to average titanium concentration in the primary particle.

It is preferable that average titanium concentration in the primary particles is 0.5 at % (atomic percent) or more and 5 at % (atomic percent) or less of constituent metal elements other than lithium (Ni, Mn, additive element M, and Ti). In this way, not only capacity and electron conductivity, but also, durability and heat stability at the time of overcharge of the secondary battery are improved, and both of durability and heat stability are achieved at a high level.

As mentioned in the above, in the secondary battery using the positive electrode active material relating to one embodiment of the present invention, heat stability is improved as a bond of oxygen and transition metal is strengthened by solid-solving Ti in the primary particles. Further, solid-solved Ti is having an effect to inhibit structural phase transition of lithium nickel manganese composite oxide crystal associated with overcharge, and this also contributes to improvement of heat stability of the secondary battery.

Further, in the positive electrode active material relating to one embodiment of the present invention, the lithium titanium compound exists on a surface of the primary particles. The lithium titanium compound may exist on at least a part of a surface of the primary particles, or the lithium titanium compound may cover entire surface of the primary particles. Further, a part of the lithium titanium compound may exist independently and separately from the positive electrode active material. When the lithium titanium compound exists on at least a part of a surface of the primary particles, electron conductivity of the obtained secondary battery is improved.

The lithium titanium compound is having high lithium ion conductivity, so a lithium titanium compound layer formed on a surface of the primary particles forms a conductive path of lithium between an electrolytic solution and the primary particles, so a surface resistance of the positive electrode active material is decreased. In addition, the lithium titanium compound is having chemically extremely high stability. Therefore, it inhibits direct contact of the electrolytic solution and a surface of active material which will be highly activated at the time of overcharge, while passing through lithium ions smoothly, so a deterioration of the positive electrode active material is inhibited, and as a result, it is considered that extremely high durability of the secondary battery is obtained. As the lithium titanium compound, one kind or more of any of $LiTiO_3$, $Li_8Ti_2O_9$, $Li_3TiO_4$, $LiTi_3O_8$ is preferable, further, $LiTiO_3$ is more preferable as it is having a high effect to improve electron conductivity.

In addition, amorphous phase may be included in a part of the lithium titanium compound. The amorphous phase is more excellent in lithium ion conductivity than crystal phase, so battery characteristics of the secondary battery is more improved.

It is especially preferable that the lithium titanium compound exists on a surface of primary particles capable of contacting the electrolytic solution. The surface of the primary particles capable of contacting the electrolytic solution includes not only a surface of primary particles exposed at outer surface of the secondary particles, but also a surface of primary particles near a surface of the secondary particles in which the electrolytic solution can infiltrate into the secondary particles, and a surface of the secondary particles exposed in a gap inside the secondary particles. Further, the surface of primary particles capable of contacting the electrolytic solution includes a surface of the primary particles exposed at a grain boundary which is in condition that the electrolytic solution can infiltrate as a bond between primary particles is incomplete, even in the grain boundary between the primary particles.

A lithium titanium compound layer formed on a surface of primary particles capable of contacting the electrolytic solution functions as a coating layer having high lithium conductivity in a positive electrode of the secondary battery, and inhibits an increase of reaction resistance of the secondary battery when the lithium nickel manganese composite oxide is used as the positive electrode active material, and on the other hand, inhibits direct contact of the electrolytic solution and the lithium nickel manganese composite oxide, and higher durability is obtained. In addition, the lithium titanium compound can be formed by increasing titanium content within the above range, and by increasing a synthesis temperature. When the titanium content is increased in the above range, a crystallite diameter described later will be decreased, and also, the lithium titanium compound will be formed on a surface of the primary particles, so that high durability is obtained.

When the lithium titanium compound is formed in minute quantity, it is difficult to confirm its existence form, but as an element to form the compound with titanium, excess lithium existing on a surface of the primary particles is considered. Here, the excess lithium means lithium components which do not form the lithium nickel manganese composite oxide with transition metals contained in the lithium nickel manganese composite oxide, and it is considered that it is a part over 1.0 in a ratio of lithium and all transition metals quantitatively. It is assumed that the excess lithium, which did not form the lithium nickel manganese composite oxide, is forming a lithium titanium compound with a titanium compound, which did not react with the lithium nickel manganese composite oxide.

In addition, the lithium titanium compound may exist in a coexisting condition of crystal and amorphous, or in a condition of amorphous. When the lithium titanium compound exists in a condition of crystal, its existence can be confirmed by X-ray diffraction measurement as its existing amount increases. In any existing form, it is assumed that the lithium titanium compound promotes movement of lithium between the electrolytic solution and the lithium nickel manganese composite oxide, and high durability of the secondary battery is obtained as deterioration of the active material is inhibited by the existence of the lithium titanium compound at least on a part of a surface of the primary particles.

A volume average particle size MV of the secondary particles is preferably 5 μm or more and 20 μm or less, more preferably 4 μm or more and 15 μm or less. When a volume average particle size MV of the secondary particles is in the above range, both of high output characteristics and battery capacity, and high filling property to a positive electrode are achieved, when the positive electrode active material is used as the positive electrode of the secondary battery. When a volume average particle size MV of the secondary particles is less than 5 μm, high filling property to the positive electrode may not be obtained, and when a volume average particle size MV of the secondary particles is more than 20 μm, high output characteristics and battery capacity may not be obtained. In addition, a volume average particle size MV of the secondary particles can be calculated, for example from an integrated value of volume measured by laser light diffraction-scattering type particle size distribution measuring device.

A crystallite diameter of the lithium nickel manganese composite oxide is preferably 500 Å or more and 2000 Å or less, more preferably 700 Å or more and 1300 Å or less. When the crystallite diameter is in the above range, high durability of the secondary battery is obtained without decreasing a battery capacity. When the crystallite diameter is less than 500 Å, there will be too much crystal grain boundaries in the positive electrode active material, and a resistance in the positive electrode active material will be increased, so sufficient charge and discharge capacity may not be obtained. On the other hand, when the crystallite diameter is more than 2000 Å, a crystal growth will progress too much, and there will be a cation mixing in which nickel will be mixed in a lithium site of the lithium nickel manganese composite oxide, which is a layered compound, and charge and discharge capacity may be decreased. In addition, when the crystallite diameter is too large, a specific surface area will be decreased, and it will lead to an increase of a reaction resistance, and further, a durability of the secondary battery may be decreased. The crystallite diameter may be set to the above range by adjusting a condition of crystallization, an addition amount of Ti, a firing temperature, a firing time, and else, described in below.

In addition, the crystallite diameter can be calculated by Scherrer's equation ($\tau = K\lambda/\beta \cos\theta$, wherein $\tau$: crystallite diameter, K: shape factor 0.9, $\lambda$: X-ray wavelength, $\beta$: full width at half maximum of diffraction peak, $\theta$: Bragg angle) from a diffraction peak in an X-ray diffraction (XRD), but the above crystallite diameter is using a crystallite diameter calculated from a diffraction peak of a (003) surface.

According to the positive electrode active material for the lithium ion secondary battery relating to one embodiment of the present invention, the positive electrode active material for obtaining the lithium ion secondary battery, in which not only capacity and electron conductivity, but also, durability and heat stability at the time of overcharge are improved, and in which both of durability and heat stability are achieved at a high level, is provided.

<2. Method for Manufacturing Positive Electrode Active Material for Lithium Ion Secondary Battery>

Next, explaining about a method for manufacturing a positive electrode active material for a lithium ion secondary battery relating to one embodiment of the present invention using the drawings. FIG. 1 is a flow chart illustrating an outline of a method for manufacturing a positive electrode active material for a lithium ion secondary battery relating to one embodiment of the present invention. A method for manufacturing a positive electrode active material for a lithium ion secondary battery relating to one embodiment of the present invention comprises a lithium nickel manganese composite oxide, and at least comprises a mixing step S3 and a firing step S4 of a crystallization step S1, a roasting step S2, a mixing step S3, and a firing step S4 illustrated in FIG. 1. Hereinafter, explaining in detail about the steps respectively. In addition, below explanation is an example of a manufacturing method and it is not intended to limit the manufacturing method.

<2-1. Crystallization Step S1>

A basic concept of a positive electrode active material in a method for manufacturing a positive electrode active material for a lithium ion secondary battery relating to one embodiment of the present invention is described in below. An effect to improve safety of the secondary battery is expressed by making an overcurrent to hardly flow, by improving a heat stability by comprising manganese as a basic composition of the positive electrode active material, and by decreasing an electron conductivity of the positive electrode active material by comprising titanium in addition to manganese.

A crystallization step S1 for obtaining a nickel manganese composite hydroxide may be performed by a publicly known method as long as composite hydroxide particles containing manganese in the above content is obtained, and for example, it may be generated by coprecipitation of the composite hydroxide particles by neutralizing a mixed aqueous solution containing at least nickel and manganese by adding a neutralizing agent while controlling pH to a constant value, while stirring at a constant speed, in a reaction tank.

As the mixed aqueous solution containing nickel and manganese, for example, a chloride solution, a nitrate solution, and sulfate solution of nickel and manganese may be used. In addition, as described in below, the mixed aqueous solution may contain the additive element M. A composition of metal elements contained in the mixed aqueous solution almost corresponds to a composition of metal elements contained in composite hydroxide particles to be obtained. Therefore, a composition of metal elements of the mixed aqueous solution may be adjusted to be same as a composition of metal elements of aimed composite hydroxide particles. As the neutralizing agent, alkali aqueous solution may be used, and for example, sodium hydroxide, kalium hydroxide, or the like may be used.

In addition, it is preferable to add a complexing agent to the mixed aqueous solution, in addition to the neutralizing agent. The complexing agent is not limited as long as it can form a complex by bonding with nickel ions or other transition metal ions in an aqueous solution in the reaction tank (hereinafter, referred to as "reaction aqueous solution"), and a publicly known complexing agent may be used, for example, an ammonium ion donor may be used. As the ammonium ion donor, for example, ammonia water, or an ammonium salt solution such as ammonium sulfate, ammonium chloride, ammonium carbonate, and ammonium fluoride may be used. A transition metal hydroxide with excellent sphericity is obtained by increasing a solubility of transition metal ions in the reaction aqueous solution, by adding the complexing agent.

In the crystallization step S1, when the ammonium ion donor (complexing agent) is used, a temperature of the reaction aqueous solution is preferably 30° C. or more and 60° C. or less, as solubility of Ni in the reaction aqueous solution increases, and also, pH of the reaction aqueous solution is preferably 10 or more and 13 or less (on the basis of 25° C.).

In addition, it is preferable that ammonia concentration of the reaction aqueous solution is maintained at a constant value in a range of 3 g/L or more and 25 g/L or less. When ammonia concentration is less than 3 g/L, it is not possible to maintain a solubility of metal ions constantly, so primary particles of the composite hydroxide with uniform particle size and shape may not be formed. In addition, nuclei in a form of gel tend to generate, so a particle size distribution of the obtained composite hydroxide particles tends to be widened. On the other hand, when ammonia concentration is more than 25 g/L, a solubility of metal ions becomes too high, and an amount of metal ions remaining in the reaction aqueous solution will be increased, and a deviation in composition of the obtained composite hydroxide particles tends to occur. In addition, when ammonia concentration is changed, a solubility of metal ions will be changed, and uniform hydroxide particles will not be formed, so it is preferable to maintain a constant value. For example, it is preferable that ammonia concentration is maintained at desired concentration with a width of upper limit and lower limit of about 5 g/L.

In addition, in the crystallization step S1, a batch type crystallization method may be used, or a continuous crystallization method may be used. For example, when the batch type crystallization method is used, the composite hydroxide particles may be obtained by collecting, filtering and water washing a precipitate after the reaction aqueous solution in the reaction tank has become steady state. In addition, when the continuous crystallization method is used, the composite hydroxide particles may be obtained by collecting, filtering and water washing a precipitate overflown from the reaction tank, by continuously supplying an aqueous solution containing a mixed raw material solution and an alkali aqueous solution, and in some cases, the ammonium ion donor.

In addition, the composite hydroxide particles may contain at least one kind of element selected from Co, W, Mo, V, Mg, Ca, Al, Cr, Zr and Ta (hereinafter, referred to as "additive element M"). In the composite hydroxide particles, a method for adding the additive element M is not limited particularly, and a publicly known method may be used, and for example, from a point of view of improving a productivity, the composite hydroxide particles containing the additive element M may be obtained by using a mixed raw material solution containing nickel, manganese, and the additive element M. In addition, a method to coprecipitate the composite hydroxide particles containing the additive element M, by adding a solution containing the additive element M separately from a raw material solution of nickel and manganese, may be selected.

As the solution containing the additive element M, an aqueous solution of sulfate, chloride, oxide, sulfide, oxyacid salt, peroxyacid salt, oxalate, hydroxide, or the like may be used.

In addition, from a point of view of facilitating a control of a composition ratio by optimizing a condition of crystallization, further, after obtaining the composite hydroxide particles by crystallization, the obtained composite hydroxide particles may be coated with the additive element M. A method for coating with the additive element M is not limited particularly, but a publicly known method may be used.

In below, explaining about an example of a method for coating with the additive element M. At first, the composite hydroxide particles obtained by crystallization are dispersed in pure water to be slurry. Next, a solution containing the additive element M corresponding to aimed coating amount is mixed into this slurry, and an acid is dropped into this slurry while adjusting to be a prescribed pH while stirring. As the acid, for example, sulfuric acid, hydrochloric acid, nitric acid, or the like is used. Next, after mixing the slurry for prescribed time, the slurry is filtered and dried to obtain the composite hydroxide particles coated with the additive element M. In addition, as other coating method, a spray drying method in which a solution containing a compound including M is sprayed on the composite hydroxide particles and then dried, an impregnating method in which a solution containing a compound including M is impregnated in the composite hydroxide particles, or the like, can be cited.

In addition, as a method for blending the additive element M into the composite hydroxide particles, a plurality of these methods may be combined, and for example, 1) the additive element M may be coated on a nickel-containing hydroxide crystallized by adding an alkali aqueous solution to a mixed aqueous solution containing nickel and manganese (however, excluding the additive element M), 2) a mixed aqueous solution containing nickel, manganese, and a part of the additive element M may be prepared, and nickel manganese composite hydroxide particles (containing the additive element M) may be coprecipitated, and further, coprecipitate may be coated with the additive element M to adjust M content.

<2-2. Roasting Step S2>

It is preferable that the method for manufacturing the positive electrode active material for the lithium ion secondary battery relating to one embodiment of the present invention further comprises a roasting step S2. In the roasting step S2, from a point of view of decreasing a variation of Li/Me further, the composite hydroxide particles obtained in the crystallization step S1 is oxidized to be composite oxide particles. A step for oxidizing the composite hydroxide to the composite oxide by heat treatment is often called a roasting step or an oxidation roasting step, but here, it is called the roasting step S2.

In the roasting step S2, it is fine as long as a moisture is removed to the extent that there will be no variation in Li/Me of the positive electrode active material, so not all of hydroxides (composite hydroxides) in the composite hydroxide particles have to be converted to composite oxides.

The heat treatment of the roasting step S2 should be heated to a temperature that residual moisture in the composite hydroxide particles will be removed, for example, it is preferable to be 105° C. or more and 700° C. or less. When the composite hydroxide particles are heated at a temperature of 105° C. or more, at least a part of residual moisture is removed. In addition, when a heat treatment temperature is less than 105° C., a long time is required for removing residual moisture, so it is not industrially appropriate. On the other hand, when a heat treatment temperature is more than 700° C., the composite oxide particles may sinter to flocculate. Thus, it is preferable that a heat treatment temperature is 350° C. or more and 700° C. or less, in order to convert most of the composite hydroxide particles to the composite oxide particles, and also, to prevent sintering.

An atmosphere to perform heat treatment is not limited particularly, and for example, from a point of view of facilitating an operation, it may be performed in an air stream. In addition, a heat treatment time is not limited particularly, but when a heat treatment time is less than one hour, there is a case that residual moisture in the composite hydroxide particles is not removed sufficiently, and a possibility for occurring a sintering as described above becomes high by a heat treatment for a long time, so a heat treatment time is preferably 5 hour or more and 15 hours or less. In addition, an equipment to be used for heat treatment is not limited particularly, and it is fine as long as it can heat the composite hydroxide particles in an air stream, and for example, a fan dryer, an electric furnace without gas generation, or the like may be used suitably.

<2-3. Mixing Step S3>

Next, explaining about a mixing step S3. In the mixing step S3, a mixture containing the nickel manganese composite hydroxide particles (hereinafter, referred to as "composite hydroxide particles") obtained in the crystallization step S1 or the roasting step S2, a titanium compound and a lithium compound is added. For example, the mixture may be obtained by adding the titanium compound and the lithium compound in powder (solid phase) to the composite hydroxide particles and mixing it.

The composite hydroxide particles added in the mixing step S3 is represented by a general formula (2): $Ni_{1-a-b}Mn_aM_b(OH)_{2+\alpha}$ (wherein, in the general formula (2), M is at least one kind of element selected from Co, W, Mo, V, Mg, Ca, Al, Cr, Zr and Ta, $0.05 \leq a \leq 0.60$, $0 \leq b \leq 0.60$, $0 \leq \alpha \leq 0.4$). A content (composition) of metals (Ni, Mn, M) in the composite hydroxide particles is approximately maintained also in a lithium nickel manganese composite oxide, so it is preferable that a content of each metal (Ni, Mn, M) is in a similar range of a content of each metals in the lithium nickel manganese composite oxide.

As the composite hydroxide particles, nickel composite hydroxide particles containing at least manganese in the above range is used. By using this nickel composite hydroxide particles, manganese may be distributed uniformly in a plurality of primary particles of the positive electrode active material to be obtained. The positive electrode active material containing (solid-solving) manganese and titanium in a plurality of primary particles is having high heat stability.

In addition, by containing manganese in the primary particles, a lithium titanium mixture may be fired at relatively high temperature. By firing at high temperature, titanium in the titanium compound may be solid-solved more uniformly in the primary particles. A method for manufacturing the composite hydroxide particles to be used is not limited particularly, but it is preferable to use the composite hydroxide particles obtained by the crystallization step S1. Because, the composite hydroxide particles obtained by the crystallization step S1 contains nickel and manganese uniformly in the particles. On the other hand, when a mixture mixing a nickel hydroxide particles and a manganese compound, or a nickel hydroxide particles coated with a manganese compound, or the like is used, manganese in the obtained positive electrode active material will be distributed ununiformly, and an effect obtained by containing manganese may not be sufficient.

As the titanium compound to be added, a publicly known compound containing titanium may be used, and for example, titanate, titanium oxide, titanium nitrate, titanium pentachloride, or the like may be used. Among these compounds, from a point of view of availability, and avoiding a mixing of impurities into the lithium nickel manganese composite oxide, titanate compound or titanium oxide is preferable. In addition, when impurities are mixed in the lithium nickel manganese composite oxide, it may lead to a decrease in cycle characteristics, battery capacity, or heat stability of the secondary battery to be obtained.

When titanium is added as solid phase particles, a reactivity in the following firing step S4 changes by a particle size of the titanium compound, so a particle size of the titanium compound to be used is an important factor. When a volume average particle size MV (hereinafter, referred to as average particle size) is calculated as one of particle size of the titanium compound to be added, a volume average particle size MV of the titanium compound is preferably 0.01 µm or more and 10 µm or less, more preferably 0.05 µm or more and 3.0 µm or less, further preferably 0.08 µm or more and 1.0 µm or less. When the volume average particle size MV is less than 0.01 µm, a problem that it will be very difficult to handle as powder tends to scatter, or a problem that it cannot be added in aimed composition, as the titanium compound will be scattered and lost in the mixing step S3 and the following firing step S4, may occur. On the other hand, when the volume average particle size MV is more than 10 µm, a distribution of Ti in the lithium nickel manganese composite oxide after firing will be ununiform, and sufficient heat stability may not be ensured. In addition, the volume average particle size MV may be calculated, for example from an integrated value of volume measured by laser light diffraction-scattering type particle size distribution measuring device.

The titanium compound may be previously pulverized to be a particle size of the above range by using a pulverizer such as a ball mill, a planetary ball mill, a jet mill, a nano jet mill, a bead mill, or a pin mill. In addition, the titanium compound may be classified by sieving or a dry type classifier, according to need.

The lithium compound is not limited particularly, and a publicly known compound containing lithium may be used, and for example, lithium carbonate, lithium hydroxide, lithium nitrate, or a mixture thereof may be used. Among these compounds, from a point of view that an influence of residual impurities is little, and that it dissolves at a firing temperature and having high reactivity, lithium carbonate, lithium hydroxide, or a mixture thereof is preferable.

The method for mixing the composite hydroxide particles, the lithium compound, and the titanium compound is not limited particularly, and it is fine as long as the composite hydroxide particles, the lithium compound, and the titanium compound are mixed sufficiently to the extent that a framework of the composite hydroxide particles and else is not destroyed. As the mixing method, for example, it may be mixed by using a standard mixer, for example, it may be mixed by using a shaker mixer, a Loedige mixer, a Julia mixer, a V blender, or the like. In addition, it is preferable that the lithium titanium mixture is mixed until it will be sufficiently uniform before the following firing step. When the mixing is not sufficient, there will be a variation in a ratio Li/Me of a substance quantity of Li and a substance quantity of metal elements Me other than Li between respective particle of the positive electrode active material, and a problem may arise such that sufficient battery characteristics is not obtained.

The lithium compound is mixed such that Li/Me in the lithium titanium mixture will be 0.95 or more and 1.20 or less. In other words, it is mixed such that Li/Me in the mixture will be same as Li/Me in the positive electrode active material to be obtained. This is because that Li/Me of the mixture in the mixing step S3 will be almost same as Li/Me of the positive electrode active material to be obtained, as Li/Me and a molar ratio of each metal element do not change before and after the firing step. In addition, it is preferable to be mixed such that an average titanium concentration in the primary particles will be 0.5 at % or more and 5 at % or less with respect to a sum of substance quantity of metal elements (Ni, Mn, additive element M, Ti) other than lithium in the mixture, and more preferably, it will be 0.03 at % or more and 3 at % or less.

<2-4. Firing Step S4>

In a firing step S4, the lithium nickel manganese composite oxide is obtained by firing the mixture obtained in the mixing step S3. The firing step S4 is performed at a temperature of 750° C. or more and 1000° C. or less, in an oxidizing atmosphere with oxygen concentration of 40 vol % or more and 100 vol % or less.

An atmosphere at the time of firing is an oxidizing atmosphere, and it is preferable that the firing is performed in an air or an oxygen stream. This is because it may not be oxidized sufficiently when oxygen concentration is less than 40 vol %, and it may be in a condition that a crystallinity of the lithium nickel manganese composite oxide is insufficient. Especially, considering battery characteristics, it is most preferable to perform firing in an oxygen stream. In addition, a furnace used in the firing is not limited particularly, and it is fine as long as it can fire the lithium titanium mixture in an air or an oxygen stream, but it is preferable to use an electric furnace without gas generation, and any of a batch type furnace or a continuous furnace may be used.

When the heat treatment is performed in the oxidizing atmosphere and the temperature condition, lithium in the lithium compound diffuse in the composite hydroxide particles or titanium coated composite hydroxide particles described in below, and generate a solid phase reaction to form the lithium nickel manganese composite oxide composed of particles of polycrystal structure. The lithium compound is dissolved in the firing step S4, and infiltrated into the composite hydroxide particles to form the lithium nickel manganese composite oxide. At this time, the titanium compound is infiltrated into the secondary particles together with the dissolved lithium compound, and further, it is infiltrated until a grain boundary of the primary particles. Titanium contained in the infiltrated titanium compound is diffused in the primary particles and solid-solved uniformly in the primary particles.

However, there is a solid-solubility limit for a solid-solving amount of titanium in the primary particles, so titanium in an amount over the solid-solubility limit react with excess amount of lithium to form a lithium titanium compound. The formed lithium titanium compound cannot diffuse into the primary particles, so they exist at a grain boundary or a surface of the primary particles, or a surface of the secondary particles.

In addition, the firing step S4 is performed at a maximum temperature of 750° C. or more and 1000° C. or less, and preferably 750° C. or more and 950° C. or less. When it is fired at a maximum temperature of 750° C. or more, the lithium compound is dissolved, and infiltrated and diffused into the composite hydroxide together with the titanium compound. On the other hand, when the firing temperature is less than 750° C., lithium and titanium will not be diffused sufficiently in the nickel manganese composite hydroxide particles, and a problem arises that sufficient battery characteristics is not obtained, as excess lithium or unreacted particles remain, or as crystal structure is not arranged sufficiently. In addition, when the firing temperature is more than 1000° C., a sintering occurs intensely between the formed lithium nickel manganese composite oxide particles, and also, abnormal particle growth may occur. When abnormal particle growth occurs, particles after firing may be coarse and they may not be able to maintain a particle form, and a problem arises that a battery capacity is decreased as a resistance of the positive electrode is increased and as a specific surface area is decreased, when the positive electrode active material is formed.

The firing time is preferably at least 3 hours or more, more preferably 6 hours or more and 24 hours or less. When the firing time is less than 3 hours, the lithium nickel manganese composite oxide may not be generated sufficiently.

Here, the titanium in an amount over the solid-solubility limit forms the lithium titanium compound with the excess lithium, but when the heat treatment temperature becomes 850° C. or more during diffusion of the titanium compound, a cation mixing of titanium tends to occur, so it is desirable to progress a generation of the lithium nickel manganese composite oxide by setting a temperature to 850° C. or more, after progressing a diffusion reaction of the lithium compound and the titanium compound sufficiently at a temperature lower than 850° C. Thus, an optimum firing condition for obtaining the aimed lithium nickel manganese composite oxide is a firing performed in two stages, in other words, it is preferable to perform heat treatment at a temperature of 750° C. or more and less than 850° C. until a diffusion reaction of the titanium compound is completed, and then, to progress a generation reaction of the lithium nickel manganese composite oxide at a temperature of 850° C. or more and 1000° C. or less. It is preferable that respective firing time is such that the firing time at a temperature of 750° C. or more and less than 850° C. is 1 to 4 hours, and that the firing time at a temperature of 850° C. or more and 1000° C. or less is 2 to 20 hours, as infiltration of the dissolved lithium compound and the titanium compound into the secondary particles progresses rapidly.

The firing step S4 may further comprise a step for heat-treating with a temperature lower than this firing temperature (calcination), before firing at a temperature of 750° C. or more and 1000° C. or less. This heat treatment is preferably performed at a temperature that the lithium compound in the mixture is dissolved and capable of reacting with the composite hydroxide particles, for example 350° C. or more, and also, it may be a temperature lower than the firing temperature. In addition, a lower limit of this heat treatment temperature is preferably 400° C. or more. By maintaining the mixture in the above temperature range, the lithium compound is infiltrated in the composite hydroxide particles, and lithium and titanium are diffused sufficiently, and uniform lithium nickel manganese composite oxide is obtained. For example, when lithium hydroxide is used, it is preferable that calcination is performed by maintaining a temperature of 400° C. or more and 550° C. or less for 1 hour or more to about 10 hours.

As mentioned in the above, the lithium nickel manganese composite oxide obtained in the firing step S4 is represented by a general formula (3): $Li_dNi_{1-a-b-c}Mn_aM_bTi_cO_2$ (wherein, in the general formula (3), M is at least one kind of element selected from Co, W, Mo, V, Mg, Ca, Al, Cr, Zr and Ta, $0.05 \leq a \leq 0.60$, $0 \leq b \leq 0.60$, $0.02 \leq c \leq 0.08$, $0.95 \leq d \leq 1.20$). And, the lithium nickel manganese composite oxide is composed of secondary particles, in which a plurality of primary particles are flocculated, at least a part of titanium in the lithium nickel manganese composite oxide is solid-solved in the primary particles, and also, a lithium titanium compound exists on a surface of the positive electrode active material for the lithium ion secondary battery.

In addition, in the lithium nickel manganese transition metal composite oxide obtained by the firing step S4, a sintering between the particles is inhibited, but coarse particles may be formed by weak sintering or flocculation. In such case, a particle size distribution may be adjusted by breaking the sintering and flocculation by crushing.

According to the method for manufacturing the positive electrode active material for the lithium ion secondary battery relating to one embodiment of the present invention, a positive electrode active material for obtaining a lithium ion secondary battery, in which not only capacity and electron conductivity, but also, durability and heat stability at the time of overcharge are improved, and in which both of durability and heat stability are achieved at a high level, is provided. In addition, the present invention is having extremely significant industrial value as it is capable of manufacturing such positive electrode active material easily for production in factory scale.

<3. Lithium Ion Secondary Battery>

A lithium ion secondary battery (hereinafter, referred to as "secondary battery") relating to one embodiment of the present invention uses the positive electrode active material as a positive electrode. Hereinafter, explaining about the secondary battery relating to one embodiment of the present invention per component respectively. The secondary battery relating to one embodiment of the present invention comprises a positive electrode, a negative electrode, and a nonaqueous electrolytic solution, and it is composed of similar components as a standard lithium ion secondary battery. In addition, the embodiment explained in below is only an exemplification, and the lithium ion secondary battery may be implemented in various modified or improved forms based on a knowledge of those who skilled in the art, beginning with the embodiment. In addition, intended use of the secondary battery is not limited particularly.

<3-1. Positive Electrode>

A positive electrode of the secondary battery is produced by using the positive electrode active material for the lithium ion secondary battery relating to one embodiment of the present invention. Hereinafter, an example of a method for manufacturing the positive electrode is explained. At first, the positive electrode active material (powder), a conductive material and a binding agent (binder) are mixed, and further, a solvent such as a viscosity modifier, or an activated carbon is added according to need, and these materials are kneaded to produce a positive electrode mixture paste.

A mixing ratio of each material in the positive electrode mixture paste will be a factor for determining a performance of the lithium ion secondary battery, so it may be adjusted according to intended use. The mixing ratio of the material may be similar to which of a positive electrode of a publicly-known lithium ion secondary battery, and for example, when a solid content in the positive electrode mixture paste excluding a solvent is 100 mass %, a content of the positive electrode active material may be 60 to 95 mass %, a content of the conductive material may be 1 to 20 mass %, and a content of the binding agent may be 1 to 20 mass %.

The obtained positive electrode mixture paste is applied, for example on a surface of a current collector made of aluminum foil, and dried to scatter the solvent to produce a sheet-shaped positive electrode. In addition, it may be pressed by a roll press device or the like, in order to increase electrode density according to need. The sheet-like positive electrode obtained as such can be used for production of battery by cutting or the like into appropriate size according to aimed battery. However, a method for producing the positive electrode is not limited to the above exemplified method, and other method may be used.

As the conductive material, for example graphite (natural graphite, artificial graphite, expanded graphite, or the like), or carbon black material such as acetylene black or Ketjen black, can be used.

The binding agent (binder) serves a function to bind active material particles, and for example, polyvinylidene fluoride (PVDF), polytetrafluoroethylene (PTFE), fluororubber, ethylene propylene diene rubber, styrene butadiene, cellulose resin, polyacrylic acid or the like, can be used as the binding agent.

According to need, a solvent for dissolving the binding agent can be added to the positive electrode mixture to disperse the positive electrode active material, the conductive material, and activated carbon. As the solvent, an organic solvent such as N-methyl-2-pyrrolidone can be used concretely. In addition, activated carbon can be added to the positive electrode mixture, in order to increase electric double layer capacity.

<3-2. Negative Electrode>

As a negative electrode, metal lithium, lithium alloy, or the like can be used. In addition, a negative electrode mixture in the form of paste is prepared by mixing the binding agent to a negative electrode active material capable of insertion and deinsertion of lithium ions, and by adding an appropriate solvent, and the negative electrode mixture is applied on a surface of a metal foil current collector such as copper, and dried, and compressed to increase electrode density according to need to form the negative electrode to be used.

As the negative electrode active material, for example, it is possible to use an organic compound fired body such as natural graphite, artificial graphite and phenol resin, and a powder body of carbon material such as coke. In this case, as the binding agent for the negative electrode, it is possible to use fluorine-containing resin such as PVDF, as well as the positive electrode, and as a solvent for dispersing these active material and binding agent, it is possible to use an organic solvent such as N-methyl-2-pyrrolidone.

<3-3. Separator>

A separator is arranged to be interposed between the positive electrode and the negative electrode. The separator retains electrolyte by separating the positive electrode and the negative electrode, and publicly-known separator can be used, for example, a thin film of polyethylene, polypropylene or the like having numerous fine holes can be used.

<3-4. Nonaqueous Electrolytic Solution>

A nonaqueous electrolytic solution is an electrolytic solution dissolving lithium salt in an organic solvent as a supporting salt. As the organic solvent, it is possible to use one kind solely or by mixing two kinds or more selected from: a cyclic carbonate such as ethylene carbonate, propylene carbonate, butylene carbonate, and trifluoro propylene carbonate; a chain carbonate such as diethyl carbonate, dimethyl carbonate, ethyl methyl carbonate, and dipropyl carbonate; an ether compound such as tetrahydrofuran, 2-methyl tetrahydrofuran, and dimethoxyethane; a sulfur compound such as ethyl methyl sulfone and butane sultone; and a phosphor compound such as triethyl phosphate and trioctyl phosphate.

As the supporting salt, it is possible to use $LiPF_6$, $LiBF_4$, $LiClO_4$, $LiAsF_6$, $LiN(CF_3SO_2)_2$ and combined salt thereof. Further, the nonaqueous electrolytic solution may contain a radical scavenger, a surfactant, a flame retardant or the like.

In addition, the secondary battery may be composed by using a solid electrolyte instead of the nonaqueous electrolytic solution. The solid electrolyte does not decompose even in high potential, so there is no gas generation or thermal runaway by decomposition of the electrolytic solution at the time of charging as can be seen in the nonaqueous electrolytic solution, so it is having high heat stability. Therefore, when the lithium ion secondary battery using the positive electrode active material according to the present invention is used, the secondary battery having higher heat stability is obtained.

<3-5. Shape and Composition of Secondary Battery>

A lithium ion secondary battery of the present invention, composed by the positive electrode, the negative electrode, the separator and the nonaqueous electrolytic solution, can be formed in various shapes such as cylindrical or layered shape. Even when the lithium ion secondary battery is adopting any shape, the positive electrode and the negative electrode are laminated via the separator to form an electrode body, and the obtained electrode body is impregnated with the non-aqueous electrolytic solution, and a positive electrode current collector and a positive electrode terminal communicating to outside, and also, a negative electrode current collector and a negative electrode terminal communicating to outside are connected using a current collecting lead or the like, and sealed in a battery case to complete the lithium ion secondary battery.

<3-6. Characteristics of Secondary Battery>

The secondary battery relating to one embodiment of the present invention is capable of achieving both of high energy density and durability, and high heat stability by inhibition of oxygen release at the time of overcharge. In addition, the positive electrode active material used in the secondary battery is obtained by the above industrial manufacturing method. The secondary battery relating to one embodiment of the present invention is suitable for a power source of compact portable electronic devices (notebook computer, mobile phone, or the like), which always requires high capacity. In addition, the secondary battery relating to one embodiment of the present invention is excellent not only in capacity and electron conductivity, but also in durability and heat stability at the time of overcharge, even compared to a battery using a conventional positive electrode active material of lithium cobalt-based oxide or lithium nickel-based oxide. Therefore, as miniaturization and high capacity can be achieved, it is suitable for a power source of electric vehicles in which loading space is restricted. In addition, the secondary battery relating to one embodiment of the present invention can be used not only for a power source of electric vehicles purely driven by electric energy, but also for a power source of hybrid electric vehicles in which electric energy is combined with a combustion engine such as a gasoline engine or a diesel engine.

EXAMPLES

Next, explaining in more detail about a positive electrode active material for a lithium ion secondary battery, a method for manufacturing a positive electrode active material for a lithium ion secondary battery, and a lithium ion secondary battery relating to one embodiment of the present invention, with reference to examples. In addition, the present invention should not be limited to these examples. In addition, a method for analyzing metals contained in the positive electrode active material and respective method for evaluating the positive electrode active material in examples and comparative examples are as described in below.

(Composition Analysis Method)

An analysis of a composition of a nickel manganese composite hydroxide and a lithium nickel manganese composite oxide were measured by ICP emission spectrometry.

(Method for Measuring Average Particle Size)

An average particle size and [(D90-D10)/MV] were calculated by laser light diffraction-scattering type particle size distribution measuring device (made by Nikkiso Co., Ltd, Microtrac HRA).

(Method for Measuring Titanium Concentration in Primary Particles)

Titanium concentration in primary particles were measured by FIB processing such that an analysis of a cross section of primary particles by STEM will be possible, after solidifying the positive electrode active material to epoxy resin. Among a plurality of secondary particles of the positive electrode active material contained in a sample, ten particles having a particle size near an average particle size were selected randomly, and further, ten primary particles in the selected secondary particles were selected randomly, and a linear analysis of an elemental composition on a line segment, through a central part of a cross section of respective primary particle and with an end point being an outer edge of the particles, was performed by EDX. An average titanium concentration on the line segment was calculated by integration to be titanium concentration in respective primary particle. An average value of titanium concentration in respective primary particle was calculated to be titanium concentration in primary particles of the sample.

(Quantitative Evaluation Method, and Method for Calculating Crystallite Diameter)

A crystal structure, a quantitative evaluation of a lithium titanium compound, and a crystallite diameter were calculated by using XRD diffraction device (made by PANalytical, X'Pert PRO), and from a result of XRD measurement, an analysis of a peak of (003) surface existing near 2θ=18 degree was performed, and a crystallite diameter in (003) surface was calculated by using Scherrer's equation.

(Method for Measuring Initial Charge and Discharge Capacity)

Figure 2:
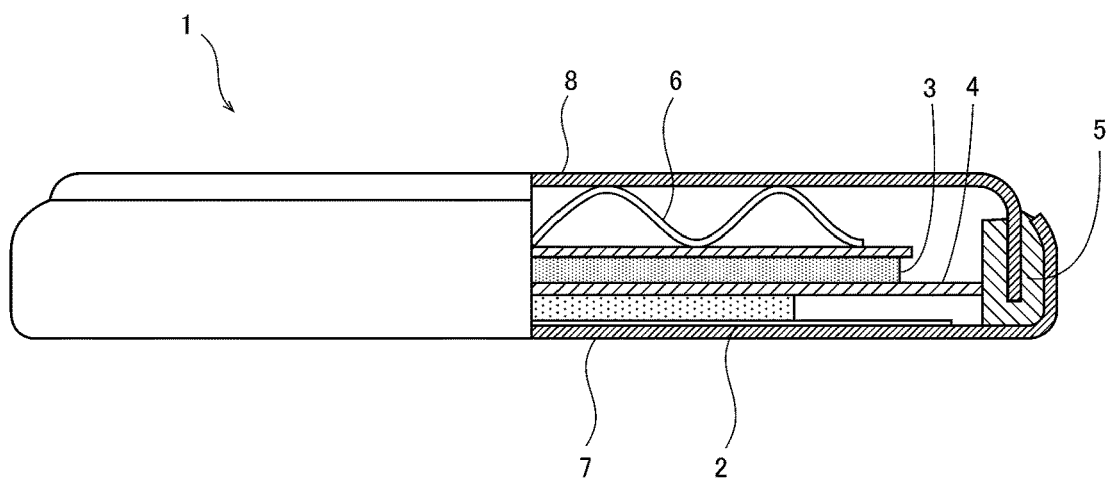
FIG. 2 is a schematic sectional view of a coin type secondary battery used for evaluation of battery characteristics.

A coin battery 1 illustrated in FIG. 2 was produced and left for about 24 hours, and after open circuit voltage OCV became stable, an initial charge capacity was measured by charging until cutoff voltage of 4.3 V with a current density with respect to a positive electrode 2 set to 0.1 mA/cm$^2$, and an initial discharge capacity was measured as a capacity when discharged until cutoff voltage of 3.0 V after stopped for one hour. For measurement of discharge capacity, a multi-channel voltage current generator (made by Advantest Corporation, R6741A) was used.

(Heat Stability Evaluation Method)

An evaluation of heat stability of the positive electrode 2 was performed by a semi-quantitative analysis of oxygen amount discharged by heating, when the positive electrode active material was in overcharge condition. A coin battery 1 was produced as in the above, and CCCV charged (constant current constant voltage charged) until cutoff voltage of 4.5 V with 0.2 C rate. Then, the coin battery 1 was disassembled and only the positive electrode 2 was retrieved carefully so that short circuit does not occur, and washed by DMC (dimethyl carbonate) and dried. The dried positive electrode 2 was weigh out for 2 mg, and a temperature was raised from a room temperature to 450° C. with temperature rising speed of 10° C./min, by using a gas chromatograph mass spectrometer (GCMS, Shimadzu Corporation, QP-2010plus). Helium was used as a carrier gas. A generation behavior of oxygen (m/z=32) generated at the time of heating was measured, and oxygen generation amount was semi-quantified from obtained peak area and peak height of maximum oxygen generation, as an evaluation index of heat stability. In addition, a semi-quantitative value of an oxygen generation amount was calculated by extrapolation of calibration curve obtained from measurement result of the gas chromatograph mass spectrometer, by injecting pure oxygen gas into the gas chromatograph mass spectrometer as a standard sample.

And, measurements and evaluations were performed about a condition of the examples and the comparative examples, using the above methods.

Example 1

<Crystallization Step>

A prescribed amount of pure water was charged into a reaction tank (60 L), and a temperature in the tank was set to 45° C. while stirring. At this time, N$_2$ gas was blown into the reaction tank, while adjusting dissolved oxygen concentration in a reaction tank solution to be 0.8 mg/L. A mixed raw material aqueous solution (total molar concentration of Ni, Mn, Co was 2.0 mol/l) of nickel sulfate, manganese sulfate, and cobalt sulfate, in which a molar ratio of nickel: manganese: cobalt is adjusted to 55: 25: 20, 25 mass % of sodium hydroxide solution as an alkali solution, and 25 mass % of ammonia water as a complexing agent, were simultaneously and continuously added in the reaction tank. At this time, a flow rate was controlled such that a retention time (reaction volume (L)/addition rate of raw material aqueous solution (L/h)) of the mixed aqueous solution was 8 hours, and simultaneously, a flow rate of sodium hydroxide solution and ammonia water were adjusted and added such that pH was 11.8 to 12.1, and ammonia concentration was 12 to 13 g/L, in the reaction tank.

After pH and ammonia concentration in the reaction tank were stabilized, a slurry containing nickel manganese cobalt composite hydroxide discharged from an overflow port was collected. The obtained slurry was solid-liquid separated by Denver filtration, and a cake of nickel manganese cobalt composite hydroxide was obtained. By passing liquid of 1 L of pure water with respect to 140 g of the cake of nickel manganese cobalt composite hydroxide in a Denver filter in which filtration was performed, impurities contained in the cake were washed and removed. The cake after passing liquid was dried for 24 hours at 120° C. in a stationary drier, and nickel manganese cobalt composite hydroxide particles represented by a composition formula $Ni_{0.55}Mn_{0.25}Co_{0.20}(OH)_2$ were obtained. An average particle size of the obtained composite hydroxide was 9.8 μm.

<Mixing Step>

After weighing the obtained nickel manganese cobalt composite hydroxide particles, lithium carbonate, and titanic acid ($Ti_2O_5 \cdot nH_2O$) powder with average particle size of 1.0 μm, such that a molar ratio of nickel, manganese, and cobalt: titanium was 97.0: 3.0 (addition amount of Ti is 3.0 at %), and that Li/Me (a ratio of substance quantity of Li and substance quantity (Me) of sum of metals of nickel, cobalt, manganese and titanium) was 1.03, they were mixed for 10 minutes using a shaker mixer (TURBULA Type T2C made by Willy A. Bachofen AG), and a raw material mixture was obtained.

<Firing Step>

After firing the obtained raw material mixture for 2 hours at 830° C. in an oxygen-nitrogen mixed gas stream with oxygen concentration of 50%, a temperature was raised until 900° C. by 5° C. per minute, and fired by maintaining the temperature for 8 hours, and then, crushed to obtain a positive electrode active material composed of a lithium nickel cobalt manganese titanium composite oxide A volume average particle size MV of the obtained positive electrode active material was 10.1 μm. As a result of XRD measurement, a peak belonging to $Li_3TiO_4$ (ICDD card No. 75-902) was confirmed. In addition, an increase in a lattice constant a, c was confirmed compared to a lithium nickel manganese cobalt composite oxide with same composition without adding titanium, and as a result of STEM-EDX analysis, it was confirmed that titanium was solid-solved in a crystal structure. On the other hand, as a result of EDX linear analysis, which is considered to be a lithium titanium compound was confirmed at a grain boundary or a surface of the active material. By combining with the result of XRD measurement, this compound was estimated to be $Li_3TiO_4$. In addition, as a result of EDX linear analysis, titanium concentration in an average primary particle calculated by the above method was 1.3 at %. Further, a result of calculating a crystallite diameter in a direction of 003 surface using Scherrer's equation, from a result of XRD measurement, was 1450 Å. In addition, as a result of ICP emission spectrometry, the lithium nickel manganese composite oxide obtained by the above method was $Li_{1.03}Ni_{0.54}Mn_{0.24}Co_{0.19}Ti_{0.03}O_2$.

(Evaluation of Electrochemical Characteristics)

52.5 mg of the obtained positive electrode active material, 15 mg of acetylene black, and 7.5 mg of polytetrafluoroethylene resin (PTFE) were mixed, and press-formed in a disc shape with a diameter of 11 mm and a thickness of 100 µm by a pressure of 100 MPa, and a positive electrode active material 2 for evaluation was produced. After drying the produced positive electrode active material for 12 hours at 120° C. in a vacuum dryer, 2032 type coin battery was produced by using this positive electrode 2 in a globe box of Ar atmosphere in which a dew point is controlled to be −80° C.

As a negative electrode, lithium (Li) metal disc with a diameter of 17 mm and a thickness of 1 mm was used, and as an electrolytic solution, an equivalent amount mixed solution (made by Tomiyama Pure Chemical Industries, Ltd.) of diethyl carbonate (DEC) and ethylene carbonate (EC), in which 1M of $LiClO_4$ is a supporting electrolyte, was used. As a separator 4, a polyethylene porous film with a film thickness of 25 µm was used. In addition, the coin battery 1 comprises a gasket 5 and a wave washer 6, and a coin battery 1 was assembled with a positive electrode can 7 and a negative electrode can 8. An initial charge capacity of the positive electrode active material obtained by the method for measuring initial charge and discharge capacity was indicated in Table 3.

(Evaluation of Durability)

Evaluation of durability was performed as below. The obtained positive electrode active material, acetylene black (conductive material), and PVDF (binder) were mixed such that a mass ratio of the positive electrode active material, acetylene black, and PVDF was 85:10: 5, and dispersed in NMP (N methyl-2-pyrrolidone), which is a solvent, to be slurried. This positive electrode slurry was applied on an aluminum foil (positive electrode current collector) with a thickness of 20 µm, by 7 mg/cm² per unit area, by using an applicator. Then, it was dried for 30 minutes at 120° C. by a fan dryer, and rolled by a roll press device to obtain a positive electrode 2 of 5.0 cm*3.0 cm. As a negative electrode 3, a negative electrode material (natural graphite base) for a lithium ion secondary battery made by Mitsubishi Chemical Corporation and acetylene black were mixed such that a mass ratio of the negative electrode material and acetylene black was 97:3, and dispersed in NMP, which is a solvent, to be slurried.

This negative electrode slurry was applied on a Cu current collector (negative electrode current collector) with a thickness of 15 µm, by a thickness of 5.0 mg/cm², by using an applicator. Then, it was dried for 30 minutes at 120° C. by a fan dryer, and the dried electrode was rolled by using a roll press device. The rolled negative electrode sheet was cut out in a rectangular shape of 5.4 cm*3.4 cm with one corner having a strip (terminal) protruding with a width of 10 mm, and the active material layer was removed from the strip, and a copper foil was exposed to form a terminal, and the negative electrode sheet with the terminal was obtained. As a separator, a generally used separator made of polyethylene with a thickness of 16 µm was used. As an electrolytic solution, a mixed solution of dimethyl carbonate (DMC) and ethylene carbonate (EC) containing 1 mol/L of $LiPF_6$ as a supporting electrolyte, in which a volume ratio of EC and DMC was EC/DMC=3: 7, was used.

By using the above members, the positive electrode 2 and the negative electrode 3 were laminated via the separator 4 to form an electrode section, and the obtained electrode section was impregnated with the electrolytic solution, sealed in a battery housing, and a laminate sell type lithium ion secondary battery was assembled. This was put in a thermostatic tank controlled to 60° C., to which a charge and discharge device was connected, and charged and discharge repeatedly for 500 times in a condition of 3.0-4.1 V and 2 C rate. A capacity maintenance rate was calculated from an initial discharge capacity and a discharge capacity after 500 cycles. As a result, an initial discharge capacity was 159.8 mAh/g, and a capacity maintenance rate was 88.1%.

(Evaluation of Heat Stability)

An evaluation of heat stability was performed by the above method. A semi-quantitative value of an oxygen generation amount calculated from the obtained peak area and peak intensity of maximum oxygen generation was 4.0 wt %. A test condition and evaluation results were indicated in Tables 1 to 3.

(Method for Determining Evaluation of Heat Stability and Evaluation of Durability)

In a method for determining an evaluation of heat stability and an evaluation of durability of the obtained battery, an initial discharge capacity and a capacity maintenance rate in an evaluation of durability and an oxygen generation amount in an evaluation of heat stability were determined by three-stage evaluation (1, 2, 3) below.

Initial Discharge Capacity (mAh/g)

3: more than 155.0, 2: 153.0 to 155.0, 1: less than 153.0
(Indicating high performance as a number of three-stage evaluation is large. Hereinafter, same applies.)

Capacity Maintenance Rate (%)

3: more than 88.0, 2: 86.0 to 88.0, 1: less than 86.0

Semi-quantitative value of oxygen generation amount (wt %)

3: less than 4.8, 2: 4.8 to 5.0, 3: more than 5.0

And, a sum of each evaluation was to be a comprehensive evaluation, and it was determined as ⊚ when the comprehensive evaluation was 9, ○ when the comprehensive evaluation was 8, △ when the comprehensive evaluation was 7, × when the comprehensive evaluation was 6 or less. The results were indicated in Table 3.

Example 2

A lithium composite oxide was prepared, and each physical property and each battery evaluation were performed, similar to the example 1, except that a molar ratio of nickel, manganese and cobalt: titanium was 94.0: 6.0 (addition amount of Ti was 6.0 at %) in the mixing step. A test condition and results of evaluation and determination were indicated in Tables 1 to 3.

Example 3

A lithium composite oxide was prepared, and each physical property and each battery evaluation were performed, similar to the example 1, except that a firing atmosphere in the firing step was an oxygen gas (oxygen concentration 100%). A test condition and results of evaluation and determination were indicated in Tables 1 to 3.

Example 4

A lithium composite oxide was prepared, and each physical property and each battery evaluation were performed, similar to the example 1, except that a firing temperature at 750° C. to 850° C. in the firing step was 780° C. A test condition and results of evaluation and determination were indicated in Tables 1 to 3.

Example 5

A lithium composite oxide was prepared, and each physical property and each battery evaluation were performed, similar to the example 1, except that a firing time at 750° C. to 850° C. in the firing step was 1.0 hour. A test condition and results of evaluation and determination were indicated in Tables 1 to 3.

Example 6

A lithium composite oxide was prepared, and each physical property and each battery evaluation were performed, similar to the example 1, except that a maximum firing temperature at 850° C. or more in the firing step was 750° C. A test condition and results of evaluation and determination were indicated in Tables 1 to 3.

Example 7

A lithium composite oxide was prepared, and each physical property and each battery evaluation were performed, similar to the example 1, except that a maximum firing temperature at 850° C. or more in the firing step was 800° C. A test condition and results of evaluation and determination were indicated in Tables 1 to 3.

Example 8

A lithium composite oxide was prepared, and each physical property and each battery evaluation were performed, similar to the example 1, except that a maximum firing temperature at 850° C. or more in the firing step was 1000° C. A test condition and results of evaluation and determination were indicated in Tables 1 to 3.

Example 9

A lithium composite oxide was prepared, and each physical property and each battery evaluation were performed, similar to the example 1, except that a firing time at 850° C. or more in the firing step was 18 hours. A test condition and results of evaluation and determination were indicated in Tables 1 to 3.

Example 10

A lithium composite oxide was prepared, and each physical property and each battery evaluation were performed, similar to the example 1, except that a firing time at 850° C. or more in the firing step was 2 hours. A test condition and results of evaluation and determination were indicated in Tables 1 to 3.

Comparative Example 1

A lithium composite oxide was prepared, and each physical property and each battery evaluation were performed, similar to the example 1, except that the titanium oxide powder was not added in the mixing step. A test condition and results of evaluation and determination were indicated in Tables 1 to 3.

Comparative Example 2

A lithium composite oxide was prepared, and each physical property and each battery evaluation were performed, similar to the example 1, except that a molar ratio of nickel, manganese and cobalt: titanium was 90.0: 10.0 (addition amount of Ti was 10.0 at %) in the mixing step. A test condition and results of evaluation and determination were indicated in Tables 1 to 3.

Comparative Example 3

A lithium composite oxide was prepared, and each physical property and each battery evaluation were performed, similar to the example 1, except that a firing atmosphere in the firing step was an oxygen-nitrogen mixed gas prepared in oxygen concentration of 30%. A test condition and results of evaluation and determination were indicated in Tables 1 to 3.

TABLE 1

| | Analysis result of raw material composite hydroxide | | Ti addition amount (at %) | Average particle size MV of added Ti compound (μm) | Oxygen concentration of firing atmosphere (%) | Firing temperature at 750° C. to 850° C. (° C.) | Firing time at 750° C. to 850° C. (h) | Firing maximum temperature at 850° C. or more (° C.) | Firing time at 850° C. or more (h) |
|---|---|---|---|---|---|---|---|---|---|
| | Composition of composite hydroxide | Average particle size MV (μm) | | | | | | | |
| Example 1 | $Ni_{0.55}Mn_{0.25}Co_{0.20}(OH)_2$ | 9.8 | 3.0 | 1.0 | 50.0 | 830 | 2.0 | 900 | 8 |
| Example 2 | $Ni_{0.55}Mn_{0.25}Co_{0.20}(OH)_2$ | 9.8 | 6.0 | 1.0 | 50.0 | 830 | 2.0 | 900 | 8 |
| Example 3 | $Ni_{0.55}Mn_{0.25}Co_{0.20}(OH)_2$ | 9.8 | 3.0 | 1.0 | 100.0 | 830 | 2.0 | 900 | 8 |
| Example 4 | $Ni_{0.55}Mn_{0.25}Co_{0.20}(OH)_2$ | 9.8 | 3.0 | 1.0 | 50.0 | 780 | 2.0 | 900 | 8 |
| Example 5 | $Ni_{0.55}Mn_{0.25}Co_{0.20}(OH)_2$ | 9.8 | 3.0 | 1.0 | 50.0 | 830 | 1.0 | 900 | 8 |
| Example 6 | $Ni_{0.55}Mn_{0.25}Co_{0.20}(OH)_2$ | 9.8 | 3.0 | 1.0 | 50.0 | 830 | 2.0 | 750 | 8 |
| Example 7 | $Ni_{0.55}Mn_{0.25}Co_{0.20}(OH)_2$ | 9.8 | 3.0 | 1.0 | 50.0 | 830 | 2.0 | 800 | 8 |
| Example 8 | $Ni_{0.55}Mn_{0.25}Co_{0.20}(OH)_2$ | 9.8 | 3.0 | 1.0 | 50.0 | 830 | 2.0 | 1000 | 8 |
| Example 9 | $Ni_{0.55}Mn_{0.25}Co_{0.20}(OH)_2$ | 9.8 | 3.0 | 1.0 | 50.0 | 830 | 2.0 | 900 | 18 |
| Example 10 | $Ni_{0.55}Mn_{0.25}Co_{0.20}(OH)_2$ | 9.8 | 3.0 | 1.0 | 50.0 | 830 | 2.0 | 900 | 2 |

TABLE 1-continued

|  | Analysis result of raw material composite hydroxide | | Test condition | | | | | | |
|---|---|---|---|---|---|---|---|---|---|
|  | Composition of composite hydroxide | Average particle size MV (μm) | Ti addition amount (at %) | Average particle size MV of added Ti compound (μm) | Oxygen concentration of firing atmosphere (%) | Firing temperature at 750° C. to 850° C. (° C.) | Firing time at 750° C. to 850° C. (h) | Firing maximum temperature at 850° C. or more (° C.) | Firing time at 850° C. or more (h) |
| Comparative example 1 | $Ni_{0.55}Mn_{0.25}Co_{0.20}(OH)_2$ | 9.8 | Not added | — | 50.0 | 830 | 2.0 | 900 | 8 |
| Comparative example 2 | $Ni_{0.55}Mn_{0.25}Co_{0.20}(OH)_2$ | 9.8 | 10.0 | 1.0 | 50.0 | 830 | 2.0 | 900 | 8 |
| Comparative example 3 | $Ni_{0.55}Mn_{0.25}Co_{0.20}(OH)_2$ | 9.8 | 3.0 | 1.0 | 30.0 | 830 | 2.0 | 900 | 8 |

TABLE 2

|  | Composition | Average particle size MV (μm) | Crystallite diameter of (003) surface (Å) | Ti concentration in average primary particle (at %) |
|---|---|---|---|---|
| Example 1 | $Li_{1.03}Ni_{0.54}Mn_{0.24}Co_{0.19}Ti_{0.03}O_2$ | 10.1 | 1450 | 1.3 |
| Example 2 | $Li_{1.03}Ni_{0.53}Mn_{0.2}Co_{0.18}Ti_{0.06}O_2$ | 10.0 | 1410 | 3.9 |
| Example 3 | $Li_{1.03}Ni_{0.54}Mn_{0.24}Co_{0.19}Ti_{0.03}O_2$ | 10.1 | 1390 | 1.3 |
| Example 4 | $Li_{1.03}Ni_{0.54}Mn_{0.24}Co_{0.19}Ti_{0.03}O_2$ | 10.1 | 1410 | 0.8 |
| Example 5 | $Li_{1.03}Ni_{0.54}Mn_{0.24}Co_{0.19}Ti_{0.03}O_2$ | 9.9 | 1420 | 0.8 |
| Example 6 | $Li_{1.03}Ni_{0.54}Mn_{0.24}Co_{0.19}Ti_{0.03}O_2$ | 9.9 | 620 | 1.0 |
| Example 7 | $Li_{1.03}Ni_{0.54}Mn_{0.24}Co_{0.19}Ti_{0.03}O_2$ | 9.9 | 1060 | 1.1 |
| Example 8 | $Li_{1.03}Ni_{0.54}Mn_{0.24}Co_{0.19}Ti_{0.03}O_2$ | 10.3 | 1890 | 1.5 |
| Example 9 | $Li_{1.03}Ni_{0.54}Mn_{0.24}Co_{0.19}Ti_{0.03}O_2$ | 10.2 | 1680 | 1.2 |
| Example 10 | $Li_{1.03}Ni_{0.54}Mn_{0.24}Co_{0.19}Ti_{0.03}O_2$ | 9.9 | 740 | 1.0 |
| Comparative example 1 | $Li_{1.03}Ni_{0.55}Mn_{0.25}Co_{0.20}O_2$ | 10.5 | 1630 | — |
| Comparative example 2 | $Li_{1.03}Ni_{0.51}Mn_{0.22}Co_{0.17}Ti_{0.10}O_2$ | 10.2 | 1360 | 6.2 |
| Comparative example 3 | $Li_{1.03}Ni_{0.54}Mn_{0.24}Co_{0.19}Ti_{0.03}O_2$ | 10.0 | 1380 | 1.4 |

TABLE 3

|  | Initial discharge capacity (mAh/g) | Capacity maintenance rate (%) | Semi-quantitative value of oxygen generation amount (wt %) | Evaluation of initial discharge capacity | Evaluation of capacity maintenance | Evaluation of heat stability | Comprehensive evaluation | Comprehensive determination |
|---|---|---|---|---|---|---|---|---|
| Example 1 | 159.8 | 88.1 | 4.0 | 3 | 3 | 3 | 9 | ◎ |
| Example 2 | 153.2 | 88.2 | 4.6 | 2 | 3 | 3 | 8 | ○ |
| Example 3 | 160.1 | 90.1 | 3.2 | 3 | 3 | 3 | 9 | ◎ |
| Example 4 | 158.9 | 86.8 | 4.2 | 3 | 2 | 3 | 8 | ○ |
| Example 5 | 158.1 | 86.1 | 4.0 | 3 | 2 | 3 | 8 | ○ |
| Example 6 | 159.5 | 87.8 | 3.9 | 3 | 2 | 3 | 8 | ○ |
| Example 7 | 160.2 | 88.0 | 3.7 | 3 | 2 | 3 | 8 | ○ |
| Example 8 | 160.0 | 88.8 | 4.0 | 3 | 3 | 3 | 9 | ◎ |
| Example 9 | 155.9 | 88.2 | 5.0 | 3 | 3 | 2 | 8 | ○ |
| Example 10 | 157.6 | 87.9 | 4.7 | 3 | 2 | 3 | 8 | ○ |
| Comparative example 1 | 171.9 | 90.5 | 6.2 | 3 | 3 | 1 | 7 | Δ |
| Comparative example 2 | 142.3 | 88.0 | 4.4 | 1 | 2 | 3 | 6 | X |
| Comparative example 3 | 154.1 | 86.6 | 3.9 | 2 | 2 | 3 | 7 | Δ |

As indicated in Table 3, the positive electrode active materials obtained by the examples 1 to 10 were ◎ or ○ in a comprehensive determination, and excellent in durability and heat stability. In all of the positive electrode active materials obtained by the examples, Ti was solid-solved in the primary particles, and also, the lithium titanium compound existed. Because Ti was solid-solved in the primary particles, it was assumed that heat stability was improved by inhibiting structural phase transition and oxygen release at the time of overcharge. Further, the lithium titanium compound existing on a surface of the primary particles was chemically stable while having high lithium ion conductivity, so it maintained electrochemical characteristics without deteriorating the active material, and as a result it was assumed that it contributed to excellent durability. In addition, a method for adding Ti may be solid phase addition or coating, and in case of coating, an effect to improve heat stability is little higher than solid phase addition. In addition, from a point of view of productivity, solid phase addition is more advantageous industrially.

On the other hand, in the positive electrode active material of the comparative example 1, Ti was not added, so an evaluation of heat stability of the obtained secondary battery was 1 compared to the secondary battery in which Ti was added, thus heat stability was worse than the examples. In the comparative example 2, titanium concentration in the primary particles was too high, so an initial discharge capacity was decreased significantly, and an evaluation of initial discharge capacity was 1. In the comparative example 3, various firing conditions were not suitable for a diffused solid-solving of titanium into the primary particles, and for a generation of lithium-titanium compound on a surface of the secondary particles, so all of discharge capacity, capacity maintenance rate, and semi-quantitative value of oxygen generation were not maintained excellently, and they were x in a comprehensive determination.

From the above, in the positive electrode active material for the lithium ion secondary battery, the method for manufacturing the positive electrode active material for the lithium ion secondary battery, and the lithium ion secondary battery relating to one embodiment of the present invention, not only capacity and electron conductivity, but also, durability and heat stability at the time of overcharge are improved, and both of durability and heat stability are achieved at a high level.

In the present embodiment, the positive electrode active material for the lithium ion secondary battery, in which not only capacity and electron conductivity, but also, durability and heat stability at the time of overcharge are improved, and in which both of durability and heat stability are achieved at a high level, is obtained by an industrial manufacturing method. This lithium ion secondary battery is suitable for a power source of compact portable electronic devices (notebook computer, mobile phone, or the like), which always requires high capacity and long life-span.

In addition, the secondary battery relating to one embodiment of the present invention is excellent in safety, and further, it is excellent in capacity and durability, even compared to a battery using a conventional positive electrode active material of lithium cobalt-based oxide or lithium nickel-based oxide. Therefore, as miniaturization and high capacity can be achieved, it is suitable for a power source of electric vehicles in which loading space is restricted.

In addition, the positive electrode active material relating to one embodiment of the present invention, and the secondary battery using the same, can be used not only for a power source of electric vehicles purely driven by electric energy, but also for a power source of hybrid electric vehicles in which electric energy is combined with a combustion engine such as a gasoline engine or a diesel engine, and for stationary storage battery.

In addition, it was explained in detail about each embodiment and each example of the present invention as the above, but it is easy for those who skilled in the art to understand that various modifications are possible without substantially departing from new matters and effects of the present invention. Therefore, all of such modified examples are included within the scope of the present invention.

For example, a term used at least once in the description or drawings together with a different term that is broader or the same in meaning can also be replaced by the different term in any place in the description or drawings. Further, the operation and the configurations of the positive electrode active material for the lithium ion secondary battery, the method for manufacturing the positive electrode active material for the lithium ion secondary battery, and the lithium ion secondary battery are not limited to those described in each embodiment and each example of the present invention, but may be carried out in various modifications.

Glossary of Drawing References

S1 Crystallization step
S2 Roasting step
S3 Mixing step
S4 Firing step
1 Coin battery
2 Positive electrode (positive electrode for evaluation)
3 Negative electrode (lithium metal)
4 Separator
5 Gasket
6 Wave washer
7 Positive electrode can
8 Negative electrode can

The invention claimed is:

1. A positive electrode active material for a lithium ion secondary battery comprising a lithium nickel manganese composite oxide composed of secondary particles, in which a plurality of primary particles are flocculated,
wherein the lithium nickel manganese composite oxide is represented by a general formula (1): $Li_dNi_{1-a-b-c}Mn_aM_bTi_cO_2$ (wherein, in the general formula (1), M is at least one element selected from the group consisting of Co, W, Mo, V, Mg, Ca, Al, Cr, Zr and Ta, $0.05 \leq a \leq 0.60$, $0 \leq b \leq 0.60$, $0.02 \leq c \leq 0.08$, $0.95 \leq d \leq 1.20$,
at least a part of titanium in the lithium nickel manganese composite oxide is solid-solved in the primary particles, and also, a lithium titanium compound exists on a surface of the positive electrode active material for the lithium ion secondary battery, and
the lithium titanium compound is at least one selected from the group consisting of $Li_3TiO_4$, $LiTiO_3$, $LiTi_3O_8$ and $Li_8Ti_2O_9$.

2. The positive electrode active material for the lithium ion secondary battery according to claim 1, wherein average titanium concentration in the primary particles is 0.5 at % or more and 5 at % or less of constituent metal elements other than lithium.

3. The positive electrode active material for the lithium ion secondary battery according to claim 1, wherein a volume average particle size MV of the secondary particles is 5 μm or more and 20 μm or less.

4. The positive electrode active material for the lithium ion secondary battery according to claim 1, wherein a crystallite diameter of the lithium nickel manganese composite oxide calculated by a full width at half maximum of 003 diffraction peak by a Scherrer method using a measurement result of XRD is 500 Å or more and 2000 Å or less.

5. A lithium ion secondary battery, wherein the positive electrode active material for the lithium ion secondary battery according to claim 1 is used as a positive electrode.

6. A positive electrode active material for a lithium ion secondary battery comprising a lithium nickel manganese composite oxide composed of secondary particles, in which a plurality of primary particles are flocculated, wherein the lithium nickel manganese composite oxide is represented by a general formula (1): $Li_dNi_{1-a-b-c}Mn_aM_bTi_cO_2$ (wherein, in the general formula (1), M is at least one element selected from the group consisting of Co, W, Mo, V, Mg, Ca, Al, Cr, Zr and Ta, $0.05 \leq a \leq 0.60$, $0 \leq b \leq 0.60$, $0.02 \leq c \leq 0.08$, $0.95 \leq d \leq 1.20$, at least a part of titanium in the lithium nickel manganese composite oxide is solid-solved in the primary particles, and also, a lithium titanium compound exists on a surface of the positive electrode active material for the lithium ion secondary battery, and the lithium titanium compound includes an amorphous phase.

7. The positive electrode active material for the lithium ion secondary battery according to claim 6, wherein average titanium concentration in the primary particles is 0.5 at % or more and 5 at % or less of constituent metal elements other than lithium.

8. The positive electrode active material for the lithium ion secondary battery according to claim 6, wherein a volume average particle size MV of the secondary particles is 5 μm or more and 20 μm or less.

9. The positive electrode active material for the lithium ion secondary battery according to claim 6, wherein a crystallite diameter of the lithium nickel manganese composite oxide calculated by a full width at half maximum of 003 diffraction peak by a Scherrer method using a measurement result of XRD is 500 Å or more and 2000 Å or less.

10. A lithium ion secondary battery, wherein the positive electrode active material for the lithium ion secondary battery according to claim 6 is used as a positive electrode.

11. A method for manufacturing a positive electrode active material for a lithium ion secondary battery comprising a lithium nickel manganese composite oxide, at least comprising:

a mixing step for adding a mixture containing nickel manganese composite hydroxide particles, a titanium compound, and a lithium compound; and a firing step for obtaining the lithium nickel manganese composite oxide by firing the mixture, wherein the nickel manganese composite hydroxide particles added in the mixing step is represented by a general formula (2): $Ni_{1-a-b}Mn_aM_b(OH)_{2+\alpha}$ (wherein, in the general formula (2), M is at least one element selected from the group consisting of Co, W, Mo, V, Mg, Ca, Al, Cr, Zr and Ta, $0.05 \leq a \leq 0.60$, $0 \leq b \leq 0.60$, $0 \leq \alpha \leq 0.4$, the firing step is performed in an oxidizing atmosphere with oxygen concentration of 40 vol % or more and 100 vol % or less, at a temperature of 750° C. or more and 1000° C. or less, the lithium nickel manganese composite oxide obtained by the firing step is represented by a general formula (3): $Li_dNi_{1-a-b-c}Mn_aM_bTi_cO_2$ (wherein, in the general formula (3), M is at least one element selected from the group consisting of Co, W, Mo, V, Mg, Ca, Al, Cr, Zr and Ta, $0.05 \leq a \leq 0.60$, $0 \leq b \leq 0.60$, $0.02 \leq c \leq 0.08$, $0.95 \leq d \leq 1.20$, the lithium nickel manganese composite oxide is composed of secondary particles, in which a plurality of primary particles are flocculated, at least a part of titanium in the lithium nickel manganese composite oxide is solid-solved in the primary particles, and also, a lithium titanium compound exists on a surface of the positive electrode active material for the lithium ion secondary battery, and the lithium titanium compound is at least one selected from the group consisting of $Li_3TiO_4$, $LiTiO_3$, $LiTi_3O_8$ and $Li_8Ti_2O_9$.

12. The method for manufacturing the positive electrode active material for the lithium ion secondary battery according to claim 11, wherein in the firing step, a firing is performed for 2 hours or more and 20 hours or less at a temperature of 850° C. or more and 1000° C. or less, after performing a firing for 1 hour or more and 4 hours or less at a temperature of 750° C. or more and 850° C. or less.

13. The method for manufacturing the positive electrode active material for the lithium ion secondary battery according to claim 11, wherein in the mixing step, a volume average particle size MV of the titanium compound to be added is 0.01 μm or more and 10 μm or less.

14. The method for manufacturing the positive electrode active material for the lithium ion secondary battery according to claim 11, wherein in the mixing step, the titanium compound to be added is titanate compound or titanium oxide.

15. The method for manufacturing the positive electrode active material for the lithium ion secondary battery according to claim 11, further comprising a roasting step for heat-treating the nickel manganese composite hydroxide particles before the mixing step, wherein the roasting step is performed at a temperature of 105° C. or more and 700° C. or less.

* * * * *